(12) United States Patent
Baeten

(10) Patent No.: US 6,535,818 B1
(45) Date of Patent: Mar. 18, 2003

(54) METHOD OF STACKING SEISMIC TRACES

(75) Inventor: Guido Josef Maria Baeten, Redhill (GB)

(73) Assignee: Schlumberger Technology Corporation, Houston, TX (US)

(*) Notice: Subject to any disclaimer, the term of this patent is extended or adjusted under 35 U.S.C. 154(b) by 0 days.

(21) Appl. No.: 09/581,417

(22) PCT Filed: Dec. 18, 1998

(86) PCT No.: PCT/GB98/03819

§ 371 (c)(1),
(2), (4) Date: Jun. 12, 2000

(87) PCT Pub. No.: WO99/32903

PCT Pub. Date: Jul. 1, 1999

(30) Foreign Application Priority Data

Dec. 19, 1997 (GB) .............................................. 9726928

(51) Int. Cl.$^7$ ................................................ G01V 1/28
(52) U.S. Cl. ........................................................ 702/17
(58) Field of Search ............................. 702/14, 17, 16; 367/73, 70, 45, 46, 43, 38

(56) References Cited

U.S. PATENT DOCUMENTS

| 5,572,483 A | * 11/1996 | Chambers et al. ............. 367/21 |
| 5,850,622 A | * 12/1998 | Vassiliou et al. .............. 367/46 |
| 5,978,314 A | * 11/1999 | Pham ........................... 367/38 |

\* cited by examiner

*Primary Examiner*—Donald E. McElheny, Jr.
(74) *Attorney, Agent, or Firm*—David S. Figatner; Moser, Patterson & Sheridan, L.L.P.

(57) ABSTRACT

A method of stacking seismic traces including the steps of deriving a representation of the noise component of each of the seismic traces; deriving an indication of the correlation between the noise components from the representations of the noise components, and producing a stacked seismic trace by combining the seismic traces in proportions derived from the correlation indications. The method can be used to produce stacked seismic traces having improved signal-to-noise ratios compared to conventionally stacked seismic traces. The preferred embodiment of this method is sometimes referred to as "covariant" stacking, because the weighting factors derived depend on the covariance of the noise components of their constituent traces.

20 Claims, 5 Drawing Sheets

METHOD OF STACKING SEISMIC TRACES

Figure 1:
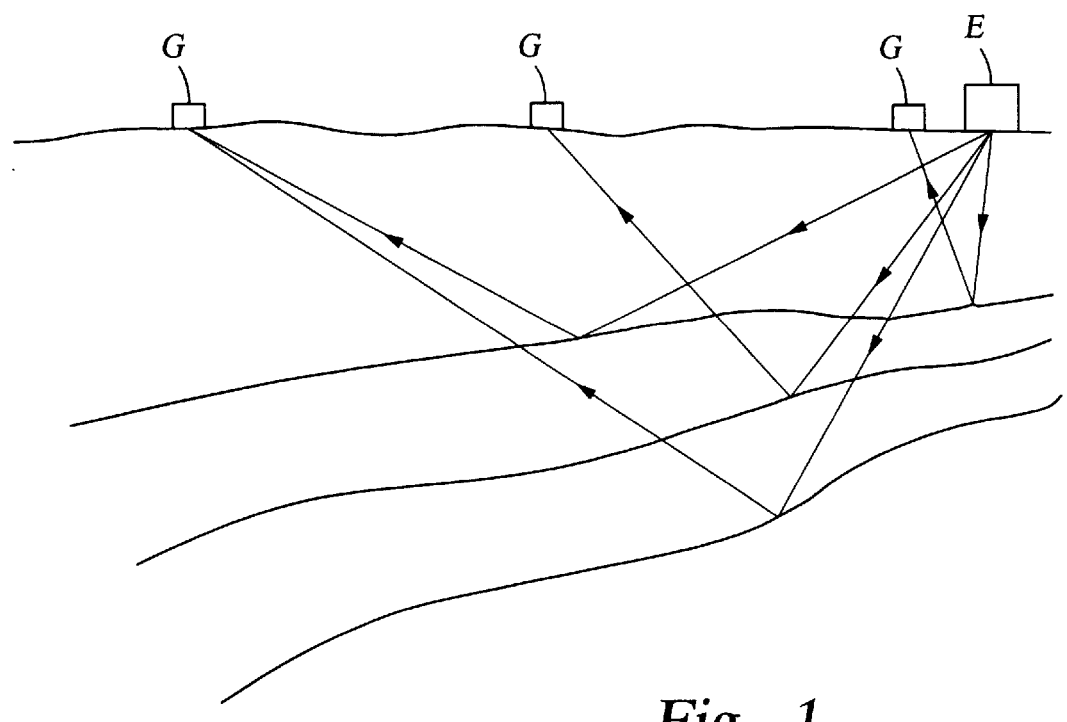

The present invention relates to a method of stacking seismic traces, in particular a method of stacking seismic traces which results in an improved signal-to-noise ratio.

The basic principles of seismic exploration are well known. Sound waves are reflected by features in the sub-surface of the earth and the reflected signals (or traces) are picked up by sensitive transducers and recorded for later analysis. On land, the seismic source is typically provided by an explosion and the seismic traces are detected by transducers known as geophones. Over water, an impulse of compressed air is provided by a so-called "air-gun" and the seismic traces are detected by hydrophones. (Other sources are possible, however). The recorded traces are then processed by a number of known techniques to provide a representation of the sub-surface. Geologists then can use this representation to determine the likelihood of hydrocarbon deposits. Many techniques are available for analysing the seismic traces and the generation of the representation of the sub-surface from these traces is beyond the scope of the present description.

The present invention is rather concerned with one of the earliest stages in the seismic analysis known as "stacking". It will be appreciated that the energy level of the seismic traces is generally very low, even when a very high amplitude source is used. In addition, a number of generally unavoidable noise sources are present while the seismic traces are being sampled. The noise of vehicles on roads, aeroplanes passing overhead, factories, drilling and natural phenomena such as rain and wind have the potential to add a large amount of noise to the sampled traces. Because of the low level of the seismic traces, the signal-to-noise ratio of the sampled traces can easily be so poor as to prevent, or at least seriously hinder, the further analysis of these signals. Indeed, it is possible in some circumstances that the amplitude of the noise component of these traces is greater than the amplitude of the signal component. The process of stacking seeks to increase the signal-to-noise ratio of the seismic traces by combining those from a number of different transducers and/or samples taken at different times (or over time) from the same transducer. Broadly speaking, the desired components of the seismic traces have been regarded as having a high degree of correlation while the noise elements of the seismic traces have been regarded as being uncorrelated. Thus, simple summation of the same seismic trace, as received at a number of different transducers, will generally provide an improvement in the signal-to-noise ratio.

However, this crude technique takes no account of the relative noise levels on the different traces. In U.S. Pat. No. 3,398,396 to P. Embree entitled "Diversity Seismic Record Stacking Method and System" the noise energy of each of the seismic traces is determined and a stacked trace is derived from a weighted sum of the seismic traces from each of the transducers. The weight applied to each seismic trace is in inverse proportion to the noise energy of that particular seismic trace. Thus, a contribution to the weighted sum is derived from each of the seismic traces but the contribution from those traces having a comparatively poor signal-to-noise ratio is less than that from traces having a comparatively good signal-to-noise ratio.

The diversity stacking technique has a major disadvantage as follows. The technique relies on the assumption that the noise component of each of the seismic traces is uncorrelated with the noise component in any of the other traces. However, in many practical situations, this assumption is not actually valid. It has been found that, as a result, diversity stacking can often result in rather poor signal-to-noise ratios. The correlation of noise components may be due to having originated at the same source (for example a factory) or, since the correlation is a mathematical concept, coincidentally from separate sources.

It is an object of the present invention to provide a method of stacking seismic traces which can provide an improved signal-to-noise ratio.

According to the present invention, there is provided a method of stacking a plurality of seismic traces comprising deriving a representation of the noise component of each of the seismic traces, deriving an indication of the correlation between the noise components from the representations of the noise components and producing a stacked seismic trace by combining the plurality of seismic traces in proportions derived from the correlation indications.

Because this method does not rely on the assumption that the noise on each trace is independent, correlated noise series can also be attenuated. This has been found to provide a stacked trace having a signal-to-noise ratio of between 2 dB and 7 dB better than the prior art techniques.

The traces may be derived from a number of seismic sensors but could also be derived from a single sensor (eg. geophone) over two or more sweeps. In this case the wanted signal is the same, or very nearly so, on subsequent sweeps and this makes the present invention particularly applicable as discussed in more detail below.

It will be shown that the optimum weighting factors for a combination of the seismic traces are related to the cross-energy density of the various noise signals. In a preferred embodiment the representation of the noise component of each of the seismic traces used to derive the proportions is the energy of the noise components. Thus, the embodiment uses not only zero-lag autocorrelations (equivalent to energy) as does diversity stacking but also zero-lag cross-correlations between the noise components.

Preferably, the covariance of the noise components of each of the seismic traces Is used to provide a set of weights for the combination of the plurality of seismic traces.

The invention may further comprise breaking the samples up into a plurality of time windows. Generally, the signal-to-noise ratio of the combined seismic trace will improve as the length of the windows is reduced. However, this becomes increasingly computationally intensive with a lower limit of one to two wavelengths of the information signal. A window duration of 400 milliseconds has been found to provide a good compromise with typical seismic traces in the region of 10 to 80 Hz.

The invention may be applied in the time domain or in the frequency domain. The advantage of performing the calculations in the time domain is that pre-processing of the seismic traces is reduced. However, processing the signals in the frequency domain has the advantage that noise reduction can be optimised. This is true of both full frequency domain analysis or separating the signal into frequency bands prior to time domain analysis.

Even in the time domain, the technique will usually benefit from separating each of the seismic traces into a number of different frequency bands. The previously referenced U.S. Pat. No. 3,398,396 to P. Embree illustrates separating seismic data into frequency bands but only in conjunction with diversity stacking. Preferably, though, the signals are separated into separate frequency bands using a quadrature mirror filter (QMF). See WO 9620451 or GB9614148-A0 for further details. The advantage to doing this lies in the fact that in seismic traces certain repetitive noise signals are found only in certain frequency bands while another frequency band or bands contain predominantly purely random noise. By splitting up the frequency spectrum of the seismic traces the stacking technique can be selected or tailored to the type of noise present.

For example, if the variation in the wanted signal between traces is large, covariant stacking may actually remove some signal. This may happen with first breaks when the signal amplitude is large. Diversity stacking may be applied in preference in these particular circumstances.

Figure 2:
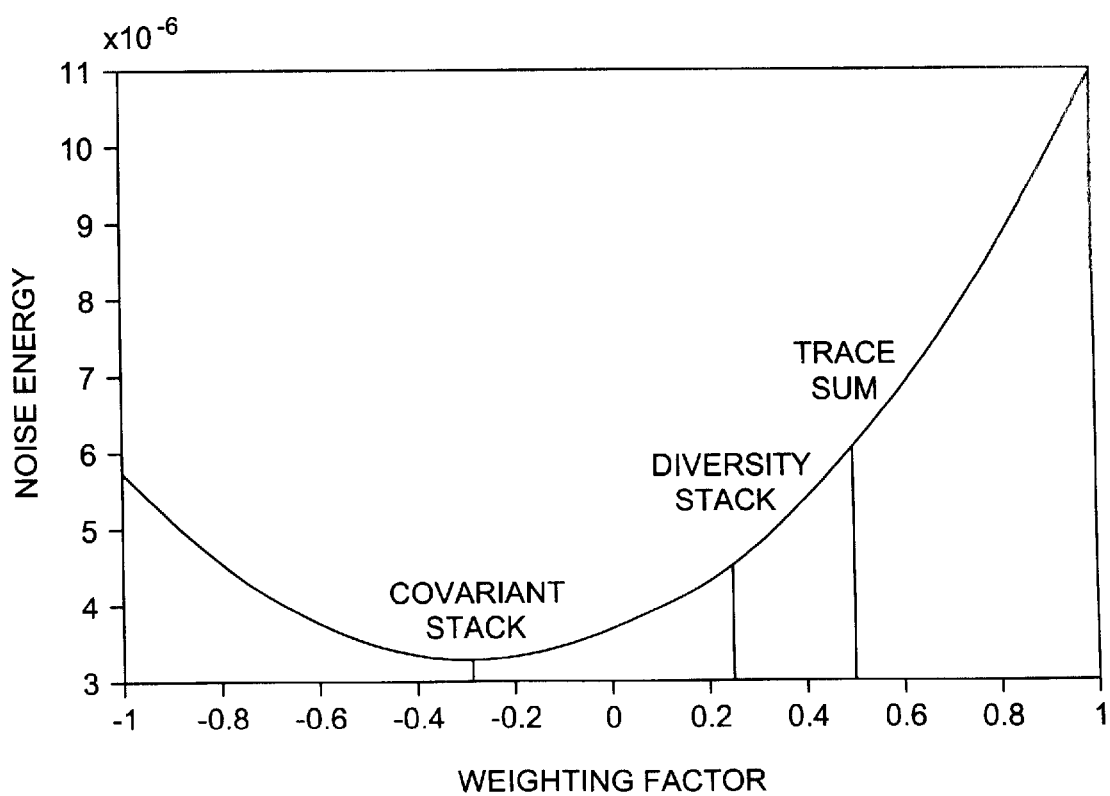
Figure 3:
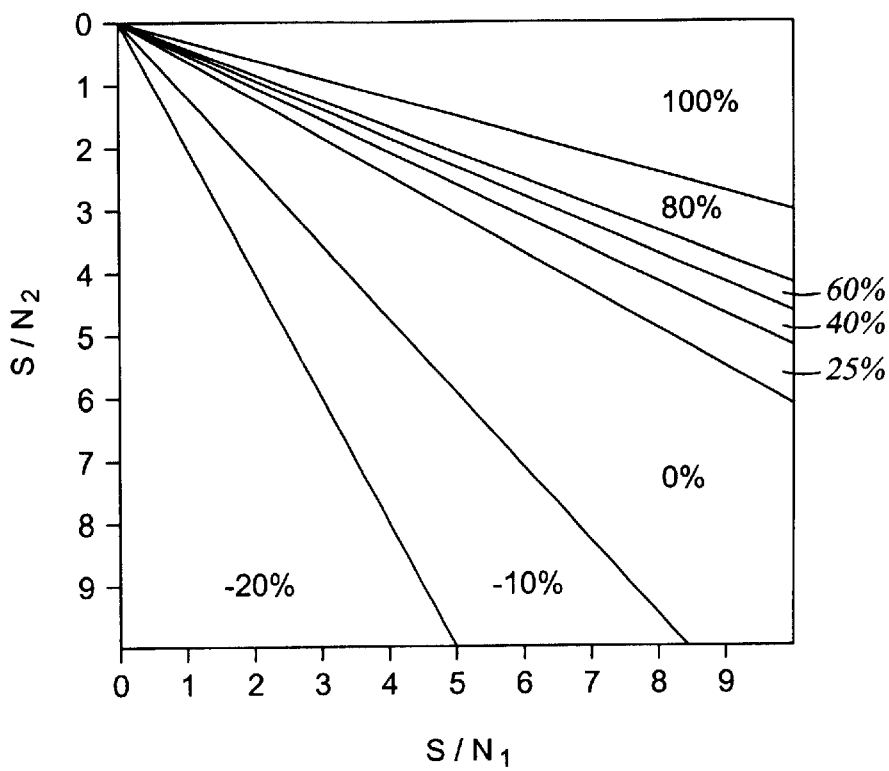
Figure 6:
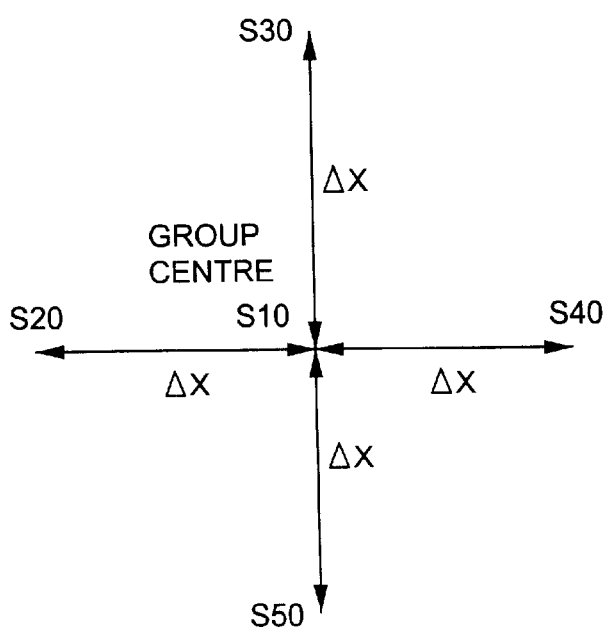
Figure 4:
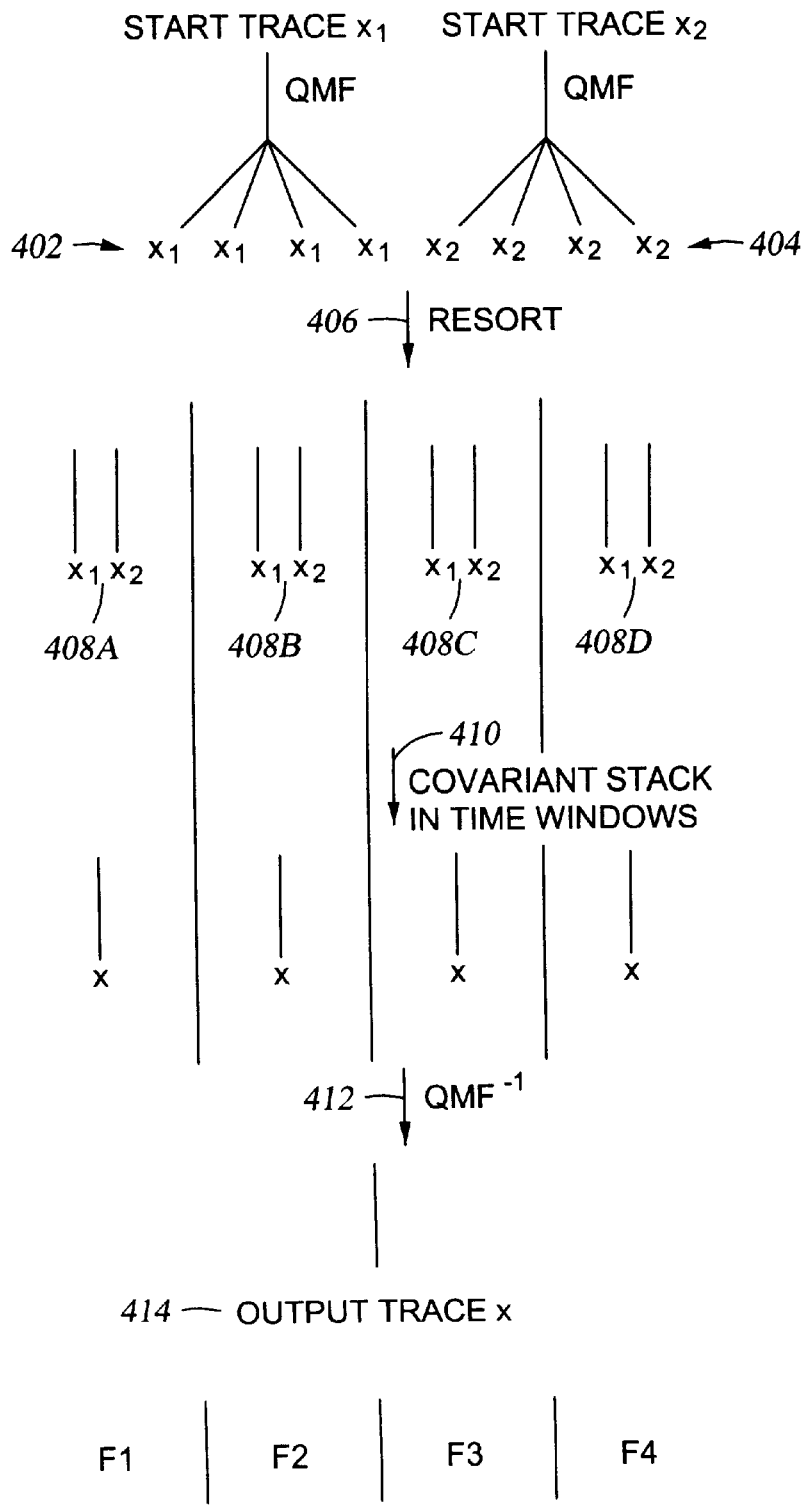
Figure 5A:
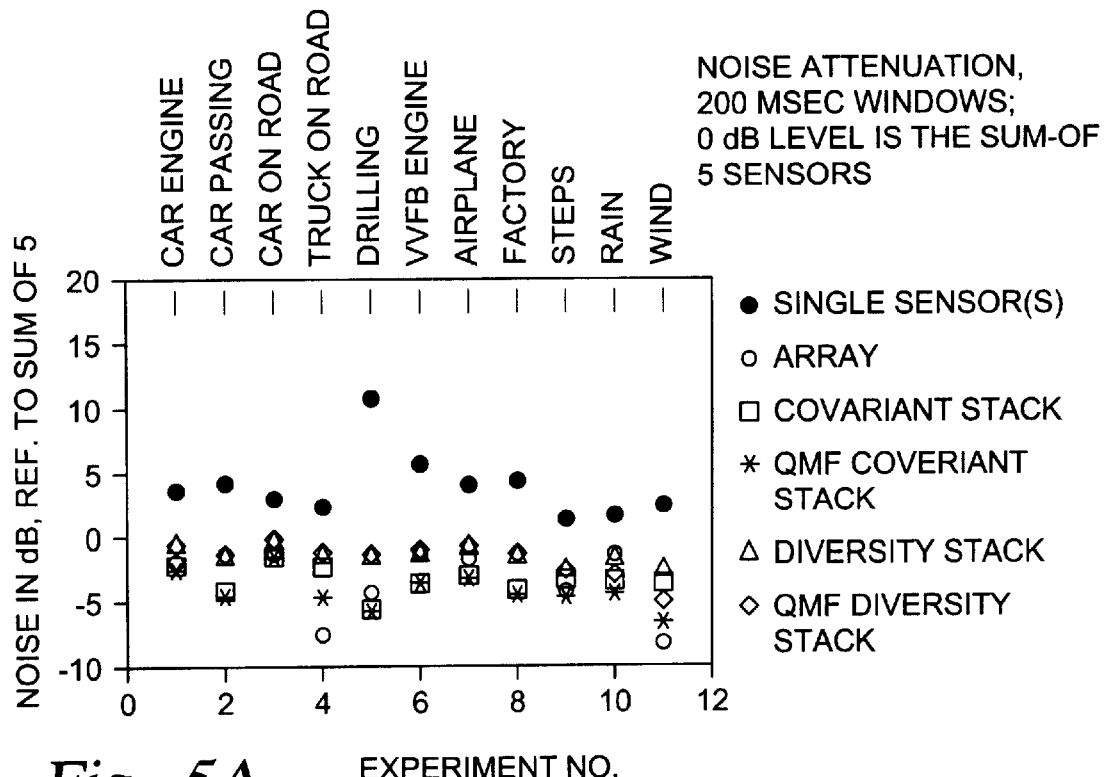
Figure 5B:
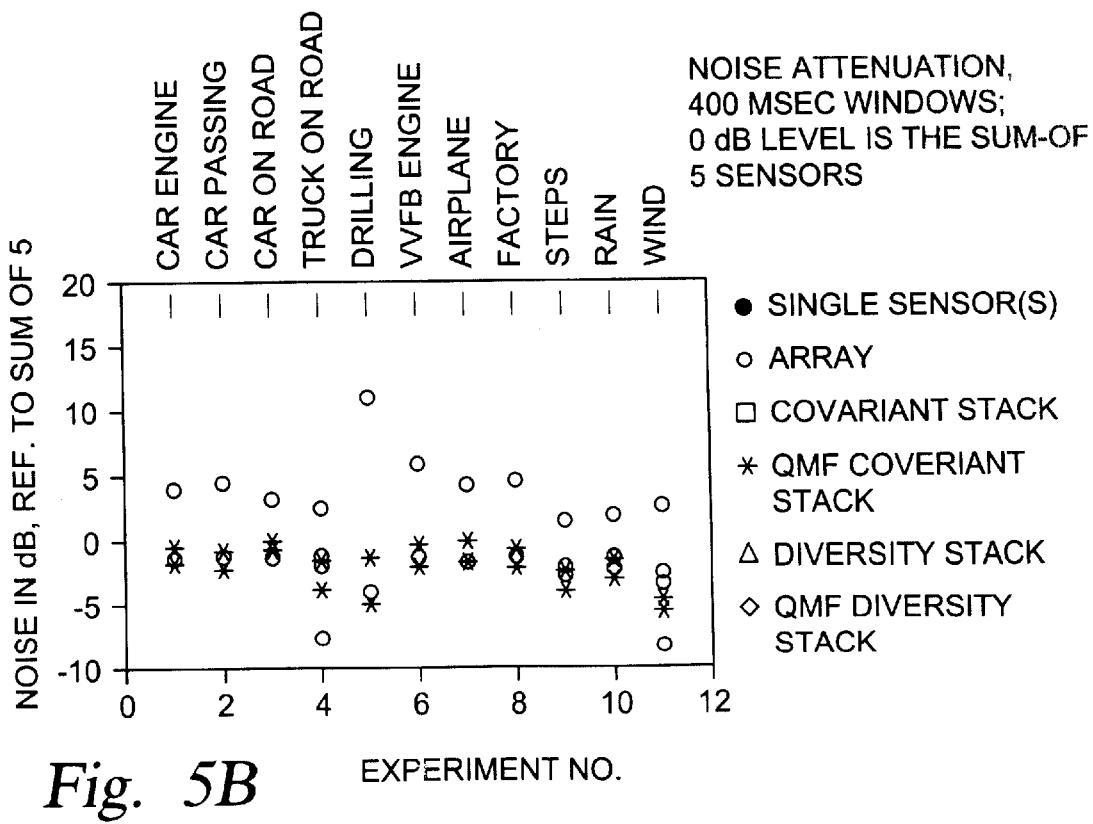

The present invention will now be described by way of example, with reference to the accompanying drawings, in which FIG. 1 shows a set of seismic sensors arranged on land, FIG. 2 shows the noise energy of two combined traces of sampled noise against the weighting factor applied to their combination, FIG. 3 shows the relative error in calculation of weighting factors for two traces against signal-to-noise ratio, FIG. 4 shows a schematic diagram of Quadrature Mirror Frequency (QMF) separation and recombination, FIG. 5 shows some comparative examples of processing the output from a group geophones using both prior art techniques and those of the invention, and FIG. 6 is a diagram in plan of one arrangement of seismic sensors to which the techniques of the present invention are applicable.

Figure 7:
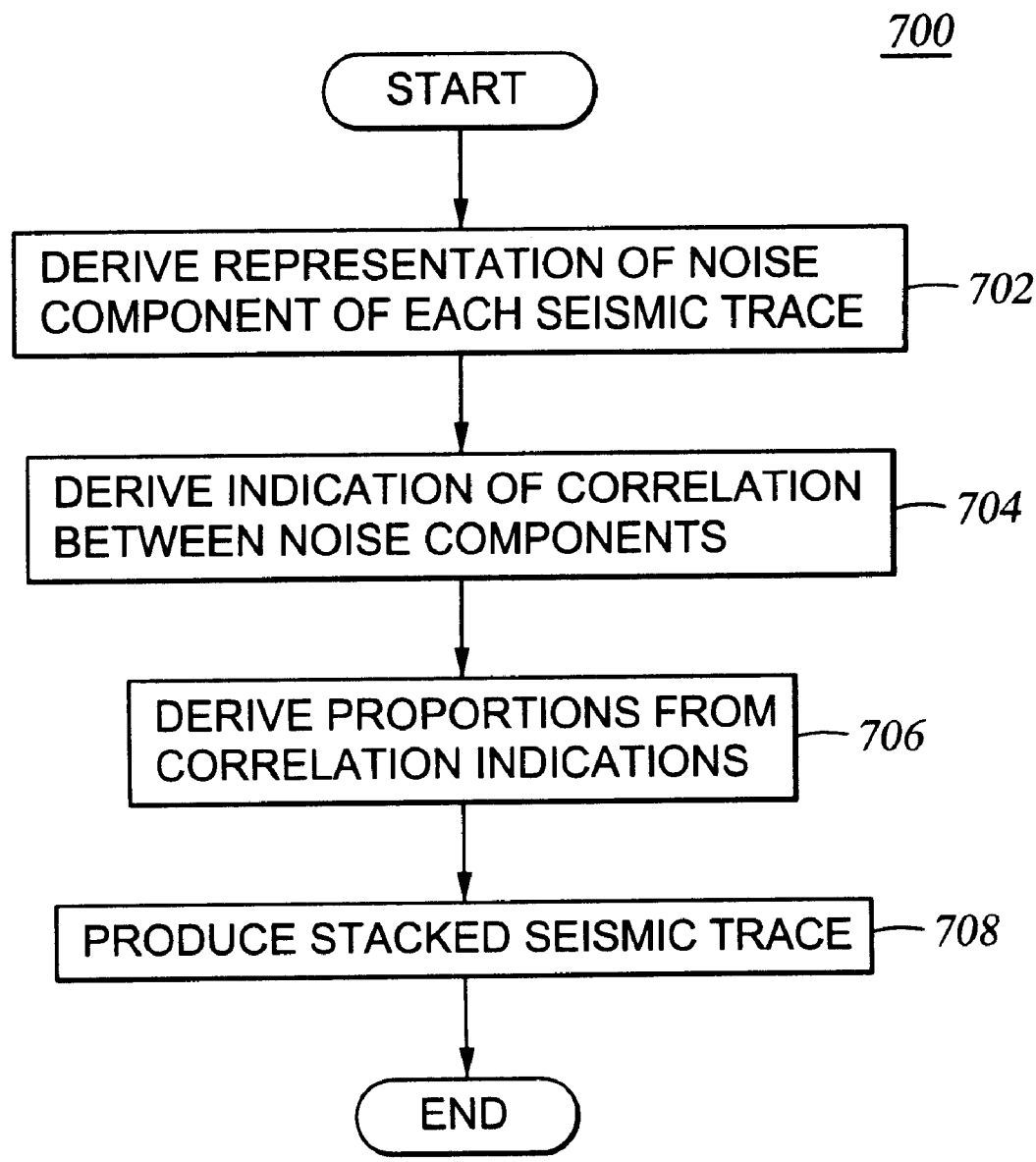

FIG. 7 is a flowchart representing one embodiment of the invention for stacking a plurality of seismic traces. The acquisition of some number of seismic traces is assumed; however, the particular number of seismic traces is not limiting of the present invention. The method 700 is entered at step 702 where a representation of the noise component of each of the seismic traces is derived. In one embodiment, the representation of a noise component is the noise energy of the noise component. At step 704, an indication of a correlation between the noise components is derived from the representations of the noise components. In one embodiment, the indication of correlation between the representations of noise components is the cross energy density of the noise components. At step 706, proportions are derived from the correlation indications. In one embodiment, the proportions are derived from minimizing a differential of the cross energy density of the noise components. Further, the proportions may be derived iteratively.

FIG. 1 shows a number of seismic sensors (in this case geophones) G and a seismic source, Explosion E, showing a few exemplary ray paths beneath the surface of the earth. After the explosion occurs, the signals detected at the geophones are sampled and stored for further analysis. The process can also be conducted over water using a boat and a number of hydrophones. Vibroseis is an alternative technique using an oscillating source which is discussed in more detail later.

Firstly, we discuss some mathematical theory underlying the invention.

We introduce the expected value E(a) of a signal a containing T samples as $$E(a) = \frac{1}{T}\sum_{i=1}^{T} a_i$$ EV and the cross-energy density E(ab) of two sampled signals a and b $$E(ab) = \frac{1}{T}\sum_{i=1}^{T} a_i \times b_i^*$$ XE in which the asterisk "*" denotes the complex conjugate value.

Normally, a and b represent (real) time-domain signals; however, the method is also applicable to frequency domain data. This is relevant when (windowed) time domain data is transformed to the frequency domain to optimise the noise reduction as will be described later. Including complex signals is straightforward and yields expressions as their real counterparts; therefore, complex signals are included in the analysis which follows. In the case of a real analysis, it is necessary to calculate the real part of ($a_1 \times b_i^*$).

Initially, for ease of analysis, we consider two sampled traces $X_1$ and $X_2$ that need to be stacked to obtain a single output trace. The stacking is performed via a linear weighting process of the two traces; the Tth output sample is a weighted sum of the Tth samples of each of the two traces. Thus, the filter process associated with the trace weighting is purely one-dimensional, in other words there is no contribution from previous or subsequent sample values.

The traces can be time-domain traces (specific time windows from seismic traces), but the invention may also be applied to frequency domain data. The sampled traces contain a reflection signal and a noise signal $n_i$(i=1,2) The assumption is now made that the reflection signal r is the same on all traces. This will be the case in practice because of sensor layout, stacking of traces from a single sensor over a number of sweeps or pre-processing applied to the traces. For example, sensors spaced no more than 20 m apart will return traces fulfilling this criterion. Consequently, the sampled signals $X_1$ and $X_2$ can then be written as $X_1 = r + n_1$ S1

$X_2 = r + n_2$ S2

This basic assumption in the following analysis that all the traces to be stacked contain the same reflection signal applies In the following cases i. Use samples from geophones located close together, in clustered groups (known as "spatial hopping").

ii. Remove amplitude perturbations and static perturbations ("perturbation corrections").

iii. Correct for the residual normal move out (NMO) between the traces, based on their differences in offset (this procedure is described in more detail subsequently).

iv. Analyse traces from a single geophone (or other sensor) at different times.

From these two sampled traces, we need to construct one single output trace. We form an output trace y by weighted sum or stack of the two traces, where the weighting factors are denoted by $w_i$(i=1,2):

$y = w_1 x_1 + w_2 x_2$ S3

By introducing the constraint that $w_1 + w_2 = 1$ S4 we ensure that the signal energy is the same for all sets of weighting factors This constraint is applied throughout this analysis so that the signal energy contents of the stacked traces derived by the different techniques is always identical Thus, improvement of signal-to-noise ratio corresponds directly to a reduction in noise energy. By minimising the noise energy, the signal-to-noise ratio is optimal.

We now calculate the noise energy which will be present in the output signal y. The noise energy $N^2$ is given by $$N^2 = E(([w_1 n_1 + w_2 n_2])^2) = w_1^2 E(n_1^2) + \quad\quad\quad\quad\text{S5}$$
$$w_2^2 E(n_2^2) + w_1 w_2 [E(n_1 n_2) + E(n_1 n_2)]$$

The energy values are calculated over windows containing T samples. The effect and selection of window length T is discussed subsequently. Since the cross energy density between the noise components of the two signals is given as $$E(n_1 n_2) + E(n_2 n_1) = 2 Re\{E(n_1 n_2)\} \quad\quad\quad\quad\text{S6}$$

in which "Re" denotes the real part, it is possible to derive the following expression for noise energy $$N^2 = w_1^2 E(n_1^2) + w_2^2 E(n_2^2) + 2 w_1 w_2 Re\{E(n_1 n_2)\} \quad\quad\quad\quad\text{S7}$$

Using the constraint that the sum of the weighting factors is 1, we can substitute $w_2 = 1 - w_1$, and obtain:

$$N^2 = w_1^2 E(n_1^2) + (1 - w_1)^2 E(n_2^2) + 2 w_1 (1 - w_1) Re\{E(n_1 n_2)\} \quad\quad\quad\quad\text{S8}$$

An example of the noise energy as a function of the weighting factor $w_1$ is presented in FIG. 2. Here, two rain noise traces of measured data were used to represent the noise.

When $w_1=1$, $w_2=0$, the noise energy of the first trace is given at the point where $w_1=1$. Thus the noise energy of the first trace is $11 \times 10^{-6}$. When $w_1=0$, $w_2=1$, the noise energy of the second trace is given at the point where $w_1=0$, approximately $3.6 \times 10^{-6}$ on the same scale as the first trace. The optimum weighting factors correspond with a minimum value of this curve.

The noise energy is minimum when its derivative with respect to $w_1$ is zero (it can easily be shown that the turning point of the curve is indeed always a minimum, and never a maximum) The differential gives.

$$\left(\frac{dN^2}{dw_1} = 0\right) \Rightarrow 2 w_1 E(n_1^2) - 2(1 - w_1) E(n_2^2) + 2(1 - 2 w_1) Re\{E(n_1 n_2)\} = 0 \quad\quad\quad\quad\text{S9}$$

and using the constraint that $w_2 = 1 - w_1$, individual values for the two weighting factors can be derived $$w_1 = \frac{Re\{E(n_2(n_2 - n_1))\}}{E[(n_1 - n_2)^2]}, \quad w_2 = \frac{Re\{E(n_1(n_1 - n_2))\}}{E[(n_1 - n_2)^2]} \quad\quad\quad\quad\text{S10}$$

Equations S10 represent the optimal weighting factors for stacking of the traces, for any kind of noise. This technique is referred to as "covariant stacking", because the weighting factors depend on the covariance of the noise components of their constituent traces Other techniques such as diversity stacking or trace summation will give more (or at best the same amount of) noise energy in the output trace. An example is given in FIG. 2, where the total noise energy for covariant stacking, diversity stacking and a simple trace sum are illustrated. Covariant stacking has located the lowest point on the curve. This technique does not require that the weighting factors are positive, as long as their sum is equal to unity, they can assume any value, depending on the seismic data. For example, FIG. 2 shows an example when one of the weighting factors ($w_1$) is −0.25. The other weighting factor ($w_2$) is therefore 1.25.

In order to illustrate the superiority of the stacking technique in accordance with the invention over that of diversity stacking the following comparison is made.

The weighting factors for diversity stacking may be obtained from the weighting factors calculated above for covariant stacking by setting the noise covariance to 0. This follows from the assumption, upon which diversity stacking relies, that the noise in different traces is uncorrelated:

$$Re\{E(n_1 n_2)\} = 0 \quad\quad\quad\quad\text{D1}$$

Inserting this assumption in equations S10, it follows that for diversity stacking, the weighting factors are given by $$w_1 = \frac{E(n_2^2)}{E(n_1^2) + E(n_2^2)}, \quad w_2 = \frac{E(n_2^2)}{E(n_1^2) + E(n_2^2)} \quad\quad\quad\quad\text{D2}$$

This equation can be rewritten such that the relation with the underlying principle of diversity stacking—the traces are weighted with the reciprocal of their noise energy—is clear $$w_1 = \frac{1}{A \times E(n_1^2)}, \quad w_2 = \frac{1}{A \times E(n_2^2)} \quad\quad\quad\quad\text{D3}$$

in which A is a scaling factor, introduced to satisfy the condition that the sum of $w_1$ and $w_2$ equals 1 (constraint S4). A is calculated as follows $$A = \left(\left[\frac{1}{E(n_1^2)} + \frac{1}{E(n_2^2)}\right]\right)^{-1} \quad\quad\quad\quad\text{D4}$$

Thus, the output trace provided by diversity stacking is equivalent to that provided by covariant stacking when—and only when—the traces to be stacked satisfy either one of the following:

$$Re\{E(n_1 n_2)\} = 0 \text{ (i.e., the noise is completely uncorrelated)} \quad\quad\text{D5}$$

or $$E(n_1^2) = E(n_2^2) \text{ (i.e., both traces have identical noise energy)} \quad\quad\text{D6}$$

The likelihood of either of these two conditions being satisfied in a practical situation is negligible. In all other situations the performance of the covariant stacking technique will be superior.

For the sake of completeness, we compare covariant stacking with straightforward trace summation. Here, we simply have $$w_1 = w_2 = 1/2 \quad\quad\quad\quad\text{TS}$$

Thus, straightforward trace summation is equivalent to the diversity stack if—and only if—both traces have identical noise energy. This is equivalent to equation D6 above. Thus, straightforward trace summation will give the same performance as covariant stacking when the noise is completely uncorrelated and the noise energy of the traces is equal. In all other situations the performance of the covariant stacking technique will be superior.

The noise energy of a stacked output trace $N^2$ is given by equation S7 above $$N^2 = w_1^2 E(n_1^2) + w_2^2 E(n_2^2) + 2w_1 w_2 Re\{E(n_1 n_2)\} \quad \text{S7}$$

Below are the general expressions for the output noise energy for each of the stacking techniques It can be shown that the noise energy for the two techniques are given by Diversity stack $$N^2 = \frac{E(n_1^2)E(n_2^2)E((n_1+n_2)^2)}{(E(n_1^2) + E(n_2^2))^2} \quad \text{NE1}$$

Covariant stack $$N^2 = \frac{E(n_1^2)E(n_2^2) - [E(n_1 n_2)]^2}{E((n_1-n_2)^2)} \quad \text{NE2}$$

The amount of improvement that the present invention provides over the prior an diversity stacking technique is now discussed.

We now calculate what happens to the signal-to-noise ratio after stacking. The ultimate objective of stacking seismic traces is to improve the signal-to-noise (S/N) ratio. After stacking, the signal energy $S^2$ is given by:

$$S^2 = E(r^2) \quad \text{SN1}$$

which is identical for both the prior art diversity stacking and for covariant stacking since the sum of the weighting factors equals unity. We define the original S/N ratio on each trace i, $S/N_1$, as $$S/N_1 = \frac{E(r^2)}{E(n_i^2)} \quad \text{SN2}$$

and the S/N ratio after stacking. S/N, as $$S/N = \frac{S^2}{N^2} = \frac{E(r^2)}{w_1^2 E(n_1^2) + w_2^2 E(n_2^2) + 2w_1 w_2 Re\{E(n_1 n_2)\}} \quad \text{SN3}$$

The S/N ratio is calculated over a finite window containing T data samples. It should be noted that, for convenience, S/N is defined in terms of energy (not square-root of energy); this implies that the S/N decibels (dB's) must be calculated as 10 log (S/N) rather than 20 log (S/N).

We now compare the ratio of the S/N ratio for diversity stacking to the S/N ratio for covariant stacking, and we show that this ratio is always smaller than 1 (provided the noise energies of the individual traces are not identical, and the noise is not perfectly uncorrelated) After some manipulations, it can be shown that:

$$\frac{(S/N)^{DIV}}{(S/N)^{COV}} = \frac{1 - \frac{(Re\{E(n_1 n_2)\})^2}{E(n_1^2)E(n_2^2)}}{1 - \frac{4(Re\{E(n_1 n_2)\})^2}{(E(n_1^2) + E(n_2^2))^2}} \quad \text{SN4}$$

Now, we know that $$\frac{1 - \frac{a}{q}}{1 - \frac{a}{p}} < 1 \Rightarrow q < p \text{ for } (a, p, q) > 0 \quad \text{SN5}$$

By analogy between equations SN4 and SN5 we can derive a simplified expression which must be satisfied if $(S/N)^{DIV}$ is to be smaller than $(S/N)^{COV}$ (Note that, by assuming that a>0, we have implicitly assumed that the noise is not perfectly uncorrelated.)

$$E(n_1^2)E(n_2^2) < \frac{1}{4}(E(n_1^2) + E(n_2^2))^2 \quad \text{SN6}$$

which is equivalent to q<p and we now prove that S/N ratio for a trace derived by diversity stacking is always smaller than S/N ratio for a trace derived by covariant stacking. The inequality can be written as $$\frac{1}{4}(E(n_1^2) - E(n_2^2))^2 > 0 \quad \text{SN7}$$

Clearly, as long as $$E(n_1^2) \neq E(n_2^2),$$

the quadratic expression is always positive and we have proved that for noise which is not perfectly uncorrelated and which differs from trace to trace, covariant stacking always results in an improved S/N ratio relative to diversity stacking.

Note that the condition that the noise is not perfectly uncorrelated need not necessary be due to a physical process (e.g. a car passing by, yielding correlated noise on adjacent traces). The condition $E(n_1 n_2) \neq 0$ is a mathematical one, meaning that the cross-correlation of two noise traces over a time window of T samples should not be identical to zero. Only by pure coincidence will the cross-correlation be zero; in practice, the noise will always be correlated to some extent over a time window, even if the noise from each trace is purely random. The same argument holds for the condition of different energy content of the noise traces. In other words, the noise energy will never be exactly the same on different traces, as well as never being perfectly uncorrelated So far, the calculations have been based on the assumption that the noise energy could be determined exactly from the sampled traces. However, in practice it is only possible to obtain noise estimates that are biased because signal energy is also present. As a result, we obtain the estimated weighting factors $\hat{w}_1$ and $\hat{w}_2$, rather than the true weighting factors $w_1$ and $w_2$, $\hat{w}_1$ and $\hat{w}_2$ are given by $$\hat{w}_1^{COV} = \frac{Re\{E(x_2(x_2-x_1))\}}{E[(x_1-x_2)^2]}, \quad \hat{w}_2^{COV} = \frac{Re\{E(x_1(x_1-x_2))\}}{E[(x_1-x_2)^2]} \quad \text{NE1}$$

for the covariant stack, and by $$\hat{w}_1^{DIV} = \frac{E(x_2^2)}{E(x_1^2) + E(x_2^2)}, \quad \hat{w}_2^{DIV} = \frac{E(x_1^2)}{E(x_1^2) + E(x_2^2)} \quad \text{NE2}$$

for the diversity stack. If we define the error in the values of the weighting factors $\Delta w$ as $\Delta w = \hat{w}_1 - w_1$ we obtain $$\Delta w^{cov} = \frac{\text{Re}\{E(r(n_2 - n_1))\}}{E[(n_1 - n_2)^2]} \text{ and thus} \qquad \text{NE3}$$

$$\frac{\Delta w^{cov}}{w_1^{cov}} = \frac{\text{Re}\{E(r(n_2 - n_1))\}}{\text{Re}\{E(n_2(n_2 - n_1))\}}$$

for the covariant stack. Note that signal energy does not enter this equation; the error is determined by the correlation between signal and noise. If signal and noise are uncorrelated, and either one of them has a zero mean value, the error is 0.

The situation is quite different for the diversity stack. In general, the error is given by $$\Delta w^{DIV} = \qquad \text{NE4}$$

$$\frac{E(x_2^2)}{E(x_1^2) + E(x_2^2)} - \frac{E(n_2^2)}{E(n_1^2) + E(n_2^2)} = \frac{E(x_2^2)E(n_1^2) - E(x_1^2)E(n_2^2)}{(E(x_1^2) + E(x_2^2))(E(n_1^2) + E(n_2^2))}$$

We now substitute $$X_1 = r + n_1 \qquad \text{NE5}$$

but the expressions become rather lengthy. The errors associated with the diversity stack are now discussed. Firstly, the diversity stack assumes that signal and noise are uncorrelated, leading to an error. A further error arises when attempting to derive the weighting factors from the data and this error comprises a first component due to the fact that the crosscorrelation between signal and noise is non-zero. The second component arises because the traces contain signal energy as well as noise. The first component is ignored here for simplicity and this is a valid simplification because, if we do the same for covariant stacking, the weighting factors are not biased. To simplify matters in the present calculation we assume that signal and noise are perfectly uncorrelated and that either one of them has zero mean $$E(rn_i) = 0 \qquad \text{NE6}$$

Note that, under this assumption, the covariant stack yields a perfect estimate of the weighting coefficients. If we use the definition of signal-to-noise ratio on trace i, S/N, given in equation SN1 the error can be written as a function of S/N$_1$ and S/N$_2$ $$\Delta w^{DIV} = \frac{S/N_2 - S/N_1}{2\left(1 + S/N_1 + S/N_2 + \frac{1}{2}\left(\frac{S/N_1}{S/N_2} + \frac{S/N_2}{S/N_1}\right)\right)} \qquad \text{NE7}$$

The relative error $\Delta w/w_1$ can be calculated from the previous expression by realising that:

$$w_1^{DIV} = \frac{S/N_1}{S/N_1 + S/N_2} \qquad \text{NE8}$$

Thus, the error introduced in the calculation of the weighting coefficients by the presence of reflection signal now depends on the signal-to-noise ratio; even if the signal and the noise are uncorrelated, biased estimates will be obtained for diversity stacking. The relative error $\Delta w/w_1$ (×100%) is shown in FIG. 3, as a function of S/N$_1$ and S/N$_2$.

In theory, when using covariant stacking, even if the noise on each trace is perfectly correlated then the noise will be perfectly attenuated. As long as the amplitude of the noise varies from trace to trace while the signal is identical on all traces, perfectly correlated noise still differs from trace to trace and can be completely removed. In practice, however, the reflection signal will not be identical on all traces. Therefore, even if the amplitude of the noise varies from trace to trace, perfectly correlated noise cannot be distinguished from a desired reflection signal containing amplitude perturbations To see this point, consider the following theoretical example. Two sampled traces are measured on an imaginary noiseless day. The noise is actually zero but the reflection element of one of the signals is slightly perturbed in amplitude its amplitude is $(1+\delta)$ times the amplitude of the other trace. The traces can thus be written as $$x_1 = r + 0 \qquad \text{AP1}$$

$$x_2 = r + \delta r \qquad \text{AP2}$$

In this case the covariant stack will give an output of zero. This is clearly unacceptable so the problem of amplitude perturbations is now addressed For this purpose, we consider the following two traces $$x_1 = r + n_1 \qquad \text{AP3}$$

$$x_2 = r + \delta r + n_2 \qquad \text{AP4}$$

Next, we make 2 assumptions:
  i. The signal and noise are uncorrelated (this is done for mathematical convenience and bears no special relationship to the perturbation problem).
  ii The amplitude perturbation is small; in particular, we will make use of the approximation $\delta^2 << \delta$.

The assumption i, is reasonable because the signal perturbation problem carries with it the serious danger that the reflection signal is removed. By contrast, the problem of correlated signal and noise leads to a bias in the weighting factors. The S/N ratio on the output may be non-optimal but there is little or no danger of seriously damaging the reflections.

The assumption ii, merely reflects the fact that we need to apply a careful perturbation correction. Even so, if we do not correct for amplitude perturbations, assumption AP5 will still hold for virtually all practical situations. Even for a 30% amplitude perturbation, assumption ii is still a good approximation.

The output trace after combination will be $$y = w_1 x_1 + w_2 x_2 = r(w_1 + w_2(1+\delta)) + [w_1 n_1 + w_2 n_2] \qquad \text{AP5}$$

The signal output, which should be simply equal to r, is now equal to $$\frac{1}{1 + \frac{E(\delta^2 r^2)}{E[(n_1 - n_2)^2]}} \times r \qquad \text{AP6}$$

Note that we can recognise the term $$\frac{E(\delta^2 r^2)}{E[(n_1 - n_2)^2]} \qquad \text{AP7}$$

as the ratio of residual signal energy to differential noise energy. In the previous example, where the noise was actually zero, the signal completely disappeared. This equation explains why this occurs. If the differential noise energy is zero, the weighting factor for r also equals zero (because the denominator become infinite).

This problem will only occur if the S/N ratio on the individual traces is very high, and amplitude perturbations are significant. For example, for a 20 dB S/N ratio on each individual geophone:

$$10 \log(S^2/N^2) = 20 \text{ or } S^2/N^2 = 100 \qquad \text{AP8}$$

and a 10% amplitude perturbation, the signal output equals 0.5 r (as opposed to the desired output of 1×r). Note that the S/N ratio here refers to the average signal—and noise energies, and not to peak amplitude. In some cases, peak signal amplitude may be very high; but even then, the average energy ratio is at a much more moderate level Although the situations in which the problem occurs may be rare especially if appropriate pre-processing has been applied, a solution to the problem is presented so that covariant stacking remains a universally applicable technique.

The simplest way to protect the signal is to put a threshold on the correlation coefficient ρ between two traces ρ is given by:

$$\rho = \frac{\text{Re}\{E(x_1 x_2)\}}{\sqrt{E(x_1^2)E(x_2^2)}} \qquad \text{AP9}$$

where the energy estimates are—as before—obtained from data windows containing T samples. If ρ has a value exceeding the threshold, it is possible to revert to diversity stacking for smaller computational overhead; in this case, the energy of the traces is so strong that we do not need the improved noise attenuation provided by the covenant stacking technique. As a realistic value for the threshold, values in the order of 0.8 to 0.9 are suitable Because in fact signal degradation only occurs if the signal perturbations are large compared to the noise, this criterion based on the complete signal provides more than adequate protection against signal deterioration.

In the foregoing, it was shown that the optimum weighting factors for the covariant stack can be determined exactly from the data, provided that $$E(rn_i) = 0 \qquad \text{DC1}$$

In words: signal and noise need to be uncorrelated. The condition of uncorrelated signal and noise is satisfied if the signal and the noise are independent, and—in addition—if either the signal or the noise has zero mean. The reason behind these constraints is that the DC components of signal and noise are always perfectly correlated (note they can also be perfectly negatively correlated). The worst-case scenario is assumed here, where the DC-components have an equal sign and the correlation is positive. DC components do not have a time variance; the condition for perfect correlation between two traces a and b, a=kb, is thus always satisfied for DC signals.

The problem of DC components is not specific to covariant stacking, it applies equally well to diversity stacking. In fact, as has been shown, even if signal and noise are perfectly uncorrelated, diversity stacking still cannot obtain unbiased estimates of the weighting factors, whereas covanant stacking can achieve unbiased estimates.

Normally, seismic traces do have zero mean. This is certified by the low-cut filter of the circuitry receiving the outputs of the geophones (the acquisition instrument). However, if time windows are selected, or even frequency-domain representations of the time windows, in general DC components will exist.

A comparison follows between what happens if the DC-component of the sampled data window is removed or remains before calculation of the weighting factors and stacking the traces. Consider the following two processing sequences i. Do not remove the mean value from the traces, calculate the weighting factors, and stack ii. Remove the mean value, calculate the weighting factors, stack, and add some kind of average of the original mean values to the stacked result. The reason that we still need the DC component is that, in general, the DC component will vary between windows; thus, locally it is a DC component, but for reconstruction of the entire seismic trace it is not.

These results are, in general, not equal, for three reasons:

a. In the first method, the mean value influences the value of the weighting factors, in the second method, it does not. Thus, the weighting factors are different for the two methods.

b. The second method requires a definition of the original mean value which needs to be added. It could be, for example, the average of the mean values of the individual traces. Even if the mean value does not affect the weighting factors, the two methods still yield different results unless the subtracted average in method ii is a weighted sum of the two mean values, where the weighting factors are equal to the weighting factors calculated in the noise reduction algorithm.

c. Provided signal and noise are independent, the second method no longer suffers from signal energy leaking into the calculation of the weighting coefficients (this is true for covariant stacking, for diversity stacking, signal energy leakage is reduced but not completely eliminated). Consequently, the second method yields more accurate weighting factors, and thus a better noise reduction, in case the signal is strong (however, this is precisely the situation in which increased noise reduction is less critical).

The first method provides the best noise reduction; the weighting factors also scale down the DC noise energy In the second method, the assumption of uncorrelated signal and noise is more closely resembled, however, especially if window lengths get small and the mean value turns into a significant portion of the traces, the non-optimum weighting of the mean values is detrimental to the noise reduction Thus, the first method (no DC removal in the data window under consideration) is preferred. The best performance is achieved when the mean value of the data is close to zero. This puts a lower limit on the minimum window size that can be employed. Generally speaking, the DC value of an entire trace is virtually zero due to the low cut filter of the acquisition instrument. The DC value of a single sample is, of course, equal to the sample value itself. As the number of samples increases, the DC value decays towards zero. A window length of the order of several hundred milliseconds provides a good compromise.

It is therefore recommended not to remove the DC component from the data, but to use windows with a length such that the mean value is small compared to the total trace energy.

We now consider the effect of window length. It must be remembered that the weighting factors given in this analysis are calculated over time windows containing T time samples (corresponding to times $t_1, t_2, \ldots t_T$, where $t_i = i\Delta t$)

$$E(n_1^2) = \frac{1}{T} \sum_{i=1}^{T} |n_1(t_i)|^2 \quad \text{TW1}$$

$$E(n_2^2) = \frac{1}{T} \sum_{i=1}^{T} |n_2(t_i)|^2 \quad \text{TW2}$$

$$E(n_1 n_2) = \frac{1}{T} \sum_{i=1}^{T} n_1(t_i) \cdot n_2 * (t_i) \quad \text{TW3}$$

The windowing, i.e. the subdivision, of the input seismic traces has an important bearing on the accuracy of covariant stacking. There are conflicting requirements between stacking over very small windows, computational load and the wavelength of the desired data.

These are two main questions which concern the windowing of the input traces a. Which window length results in the best performance of the covariant stacking? In other words, which window length yields the best noise attenuation?

b. For a given window length, at what intervals should the weighting factors be calculated?

a. With regard to the first question: the accuracy with which the weighting factors are determined, and the degree of signal preservation, are positively related to the window length; but the highest noise attenuation is achieved using small window lengths. A window length of several hundreds of milliseconds is a realistic practical value. Below, we summarise the arguments underlying this statement.

In the first case, prior to covariant stacking, the weighting coefficients are estimated from the data. In this procedure, we have to assume that signal and noise are uncorrelated. This assumption is correct if:

$$Re\{E(r(n_2-n_1))\}=0 \quad \text{W1}$$

To evaluate whether W1 is reasonable, we proceed as follows First, it is reasonable to assume that the reflection signal and the noise are independent:

$$Re\{E(r(n_2-n_1))\}=Re\{E(r)\}\times Re\{E(n_2-n_1)\} \quad \text{W2}$$

Thus, the estimation of the weighting factors of the covariant stack from the data is accurate provided that either the noise or the signal component has zero mean $$Re\{E(r)\}=0, \text{ or } Re\{E(n_2-n_1)\}=0 \quad \text{W3}$$

The mean value of the signal and the noise depends on the time window under consideration. In general, the longer the window, the lower the mean value. For example, taking the whole trace as a window ensures that the mean value of the data is indeed (virtually) zero, due to the low-cut filter which is normally present in the acquisition instrument. The other extreme, using only 1 sample as a window, results in a mean value equal to the single sample value, which will in general not be zero. Note that the 1-sample window suffers from another problem: there is no basis to distinguish between signal and noise in this case, and the covariant stack will simply yield a zero output (if the samples have the same polarity).

In one example, to obtain an approximate zero mean for the signal energy, we can aim at choosing a window length which is related to the duration of the seismic wavelet. It is reasonable to assume that a particular reflection signal has approximately zero mean. For a typical reflection dominant frequency of 20–40 Hz, we obtain a wavelet duration of 25–50 msec. A minimum window length of several times this wavelet duration (thus, a few hundreds of msec) is then recommended, to account for reflections which extend outside the window under consideration. There is no upper limit but, in general, noise reduction decreases with increasing window length.

In general, in the second case the degree of noise attenuation increases with decreasing window length. The reason is that covariant stacking works best when amplitude differences between the individual noise traces are largest, or when the traces have a high degree of correlation. Choosing large windows tends to reduce these effects. Thus, from this point of view, a window length as short as possible is recommended. As an extreme example, if we consider pure noise records, a 1-sample window would result in complete noise cancellation for the covariant stack but, of course, also in signal cancellation.

b. With regard to the second question: first of all, we assume that the calculated weighting factor for a given window is assigned to the centre sample in the window. In general, we calculate weighting factors every Nth sample, thereby shifting the window N samples downwards for each subsequent calculation. If we denote the window length L, and the amount of window overlap by O, where O is given by $$O = \frac{L-N}{L} \times 100\% \quad \text{W4}$$

We now consider what overlap O to use. It is preferred to have a 99 something% overlap (thus calculating a weighting factor for each sample) this gives the highest accuracy, and the smooth behaviour of the weighting factors ensures adequate handling of signal perturbations, but at the cost of a higher computational load. Below, we summarise the arguments underlying this statement i. Accuracy In general, the noise sequence will be non-stationary. This is best accounted for by using a large window overlap (and short window lengths).

ii. Computational load. Obviously, the computational load increases with increasing window overlap.

iii. The presence of signal perturbations. These cause performance to deteriorate with long overlaps.

In the theory, we assume that the reflection signal is the same on all of the traces. Therefore, for all possible combinations of the weighting factors along the traces in the group of seismic traces, and for all variations of the weighting factor as a function of time within a trace, the signal output is always identical (provided the sum of the weighting factors is 1). In practice, however, signal variations from trace to trace will occur, a strongly varying weighting factor as a function of time and trace number would therefore give rise to a discontinuous appearance of the seismogram. Choosing a 100% overlap means that the energy terms for each new weighting factor calculation are almost identical each subsequent calculation requires deletion of one sample and the introduction of one new sample, while retaining all the other sample values, thus, the variation is not expected to be large. Nevertheless, if the newly introduced sample represents a spike, a jump in the weighting factors occurs some modest smoothing should be applied to prevent this, for example using moving average, low pass or similar filters. Note that the window length also affects the variation of the weighting factor if the window length is large, the effect of replacing just one sample is relatively small.

The signal perturbation problem is not specific to covariant stacking. it also occurs in diversity stacking. The variation in the weighting coefficients not only depends on the window overlap, it also depends on the number of traces. In general, the more traces used in the estimation, the smoother the weighting coefficients' behaviour The performance of the covariant stack is best for short window lengths, when the correlation of the noise is largest. However, to fulfil the assumptions In the theory (zero mean for either the signal or the noise), the window length preferably should be large. Also, overlapping windows and/or smoothing of the weighting factors may be applied to attack the problem of reflection signal perturbations and non-stationary noise characteristics.

Normally, covariant stacking is applied to time windows, within a time window, noise differences and correlation properties are more pronounced than in the entire trace. We can go one step further by dividing each time window in several frequency bands. This can further improve the noise reduction capability of covariant stacking. Consider the example where the data has a varying, correlated noise component between 30 and 50 Hz, but also contains a strong but uniform, uncorrelated noise component between 0 and 30 Hz. In this case, neither diversity stacking nor covariant stacking can significantly improve the simple summation result The reason is that the (cross) energy calculations required for both stacking processes are dominated by this 0–30 Hz component, all information about the 30–50 Hz noise is lost If we could apply the covariant stacking to different frequency bands (e g, 0–30 Hz and 30–60 Hz), we would be able to attenuate the varying, correlated 30–60 Hz noise series. One means to achieve this is the so-called Quadrature Mirror Filter (QMF), which can split a time series into N series, in which each of the N split time series corresponds to a different frequency band. It is worthwhile noticing that this approach is advantageous if the noise is non-while and/or the correlation properties of the noise vary with frequency. In general, both of these conditions will be met to some degree in practice.

FIG. 4 is a diagram showing how the QMF-process is integrated in the covanant stacking process. In this example, we assume that the data is split into 4 frequency bands (F1, F2, F3, F4). In practice any split can be chosen, as long as it is a power of 2 (for more details on the QMF, the reader is referred to the patent document above. The starting point are two input traces, $r_1$ and $r_2$. Next, each trace is divided into 4 parts. each part representing a different frequency range, using the QMF filter. The split traces are re-sorted so that covariant stacking is applied to corresponding frequency bands of each trace. Finally, the output data is constructed using the inverse QMF technique, combining the 4 different frequency bands.

For simplicity, the previous description concentrated on just two seismic traces and this is now extended to include an arbitrary number of seismic traces. We consider a geophone group containing M geophones. If the geophones are located closely together, static and amplitude perturbations have been removed, and if the residual NMO between the geophones has been accounted for (see later), these geophones will receive the same reflection signal r, but they will, in general, contain different noise signals $n_1$. However, the invention is also applicable to single geophones, especially with vibroseis and to more widely-spaced sensors given adequate pre-processing. The geophone output of the ith geophone, $x_1$, is written as $$x_i = r + n_i \quad \text{M1}$$

Next, we consider a weighted addition y of the traces $x_1$, where the weighting factors are denoted by $w_1$ $$y = \sum_{i=1}^{M} w_i x_i = r \sum_{i=1}^{M} w_i + \sum_{i=1}^{M} w_i n_i \quad \text{M2}$$

The average signal energy, $S^2$, in the summed output trace y is given by $$S^2 = E\left(\left[r\sum_{i=1}^{M} w_i\right]^2\right) = E(r^2)\left[\sum_{i=1}^{M} w_i\right]^2 \quad \text{M3}$$

The average noise energy in the summed output, $N^2$, is given by $$N^2 = E\left(\left[\sum_{i=1}^{M} w_i n_i\right]^2\right) = \sum_{i=1}^{M} \sum_{j=1}^{M} w_i w_j E(n_i n_j) \quad \text{M4}$$

The signal-to-noise (S/N) ratio then follows from $$([S/N])^2 = \frac{S^2}{N^2} = \frac{E(r^2)\left[\sum_{i=1}^{M} w_i\right]^2}{\sum_{i=1}^{M} \sum_{j=1}^{M} w_i w_j E(n_i n_j)} \quad \text{M5}$$

Next, we determine the weighting factors $w_i$ such that the S/N ratio is maximised, subject to the constraint that the sum of the weighting factors is unity:

$$\sum_{i=1}^{M} w_i = 1 \quad \text{M6}$$

Therefore, signal energy is identical for all possible combinations of weighting factors satisfying constraint M6, and the problem is now to find the minimum noise energy For this purpose, constraint M6 is written as $$w_M = 1 - \sum_{i=1}^{M-1} w_i \quad \text{M7}$$

Note that we choose to express $w_M$ in terms of the other weighting coefficients ($w_1$, $w_2$, $w_3$, $w_{(M-1)}$). This choice is arbitrary, and made for mathematical convenience only.

Substituting constraint M7 for $W_M$ into equation M4 yields $$N^2 = \left(1 - \sum_{i=1}^{M-1} w_i\right)^2 E(n_M^2) + \\ \left(1 - \sum_{i=1}^{M-1} w_i\right) \sum_{j=1}^{M-1} 2w_j \text{Re}\{E(n_j n_M)\} + \sum_{i=1}^{M-1} \sum_{j=1}^{M-1} w_i w_j E(n_i n_j) \quad \text{M8}$$

We minimise the noise energy by setting its derivative with respect to each of the weighting coefficients to zero $$\frac{\partial}{\partial w_K}(N^2) = 0 \text{ for } K = 1, 2, \ldots M - 1 \quad \text{M9}$$

After some manipulation, this yields $$\sum_{j=1}^{M-1} w_j \text{Re}\{E((n_j - n_M)(n_k - n_M))\} = -\text{Re}\{E(n_M(n_k - n_M))\}$$

which must be satisfied for k=1,2, . . . , M−1.

It is now advantageous to construct the difference of each noise trace with the last noise trace, as follows $$\tilde{n}_l = n_l - n_M \text{ for } l=1, 2, \ldots, M-1 \quad \text{M11}$$

For notational convenience, we also introduce a zero trace $n_0$ (that is, a trace containing zeros only, which is assigned the suffix zero), and define:

$$\tilde{n}_0 = n_0 - n_M = -n_M \quad \text{M12}$$

Equation M10 can then be written as $$\sum_{j=1}^{M-1} w_j \text{Re}\{E(\tilde{n}_j \tilde{n}_i)\} = \text{Re}\{E(\tilde{n}_0 \tilde{n}_i)\} \text{ for } i = 1, 2. \quad .(M-1) \quad \text{M13}$$

Now, to simplify even further, we introduce the notation $$\tilde{N}_{ij} = \tilde{N}_{ji} = \text{Re}\{E(\tilde{n}_j \tilde{n}_i)\} = \text{Re}\{E((n_i - n_M)(n_1 - n_M))\} \quad \text{M14}$$

and equation M13 finally becomes $$\sum_{j=1}^{M-1} w_j \tilde{N}_{ij} = \tilde{N}_{0i} \text{ for } i = 1, 2. \quad .(M-1) \quad \text{M15}$$

This can be written as a matrix equation, as follows $$\tilde{N}\vec{w} = \vec{b} \quad \text{M16}$$

in which $\tilde{N}$ is an (M−1)×(M−1) matrix, whose elements are given by $\tilde{N}_{ij} = \tilde{N}_{ji} \vec{w}$ is a vector containing the weighting coefficients $$\vec{w} = [w_1 w_2 \ldots w_{M-1}]^T \quad \text{M17}$$

and $\vec{b}$ is a vector whose elements are given by $$b_1 = \tilde{N}_0, \quad \text{M18}$$

The weighting factors then simply follow from $$\vec{w} = \tilde{N}^{-1} \vec{b} \quad \text{M19}$$

Note that $\tilde{N}$ is a symmetric matrix, and its inverse can be calculated efficiently using the Cholesky decomposition Solving the matrix equation yields the vector of weighting coefficients M17, as a final step, then, $w_M$ is calculated via the relation $$w_M = 1 - \sum_{i=1}^{M-1} w_i \quad \text{M20}$$

It can be shown that the resulting noise energy in the summed output, $$N^2 = E\left[\left(\sum_{i=1}^{M} w_i n_i\right)^2\right] = \sum_{i=1}^{M} \sum_{j=1}^{M} w_i w_j E(n_i n_j) \quad \text{M21}$$

reduces to:

$$N^2 = \sum_{i=1}^{M} w_i E(n_i n_j)$$

for the covariant stack Any value of j in the interval [1,M] can be used in equation M22 to calculate the noise, it will always give the same result.

So far, we have expressed the covariant weighting factors in terms of the noise energy. In practice, the noise is unknown, as the recordings contain desired reflections and additive noise. The matrix $\tilde{N}$, however, is easily constructed from the data Since $$n_i - n_j = (r + n_i) - (r + n_j) = x_i - x_j \quad \text{NE1}$$

the matrix $\tilde{N}$ can directly be replaced by the matrix $\tilde{X}$. So, we obtain $$\tilde{N} = \tilde{X} \quad \text{NE2}$$

with $$\tilde{N}_{ij} = \tilde{X}_{ij} = \text{Re}\{E(\tilde{x}_i \tilde{x}_j)\} = \text{Re}\{E((x_i - x_M)x_j - x_M)\} \quad \text{NE3}$$

and the weighting factors follow from $$\vec{w} = \tilde{X}^{-1} \vec{b} \quad \text{NE4}$$

The remaining problem is to estimate $\vec{b}$ from the data The elements of $\vec{b}$ are given by $$b_1 = \tilde{N}_0 = \text{Re}\{E(-n_M(n_1 - n_M))\} \quad \text{NE5}$$

The last term in the expression is easily obtained from the data $$n_1 - n_M = x_1 - x_M \quad \text{NE6}$$

so that $$b_1 = \text{Re}\{E(-n_M(n_1 - n_M))\} = \text{Re}\{E(-n_M(x_1 - x_M))\} \quad \text{NE7}$$

This leaves us with the problem of determining the noise $n_M$, here we simply estimate the noise trace from the raw data (note other approximations could be made)

$$x_M \approx n_M \quad \text{NE8}$$

Signal preservation should again be enforced by limiting the maximum allowable correlation coefficient between traces as discussed previously.

Alternatively, we could use a different signal estimate. If, for example, all of the traces were summed, the output would contain the signal "r" plus the summed noise of all the traces. Because the noise will be attenuated relative to the signal, the signal estimate will have less noise. If the sum of M sensors is referred to as SUM, the noise estimate would be x(M)-SUM. To improve the noise estimate, we generally require some estimate of the signal so that it can be subtracted. Therefore, instead of summing all of the traces, we could perform a diversity stack or derive a median value and so on. Indeed, it is possible to use covanant stacking to derive the signal estimate the then re-perform covanant stacking but this would, of course, increase the required processing.

The computational load imposed by covanant stacking is greater than that required by diversity stacking. However, the increase is one that can be provided for as the following shows.

Diversity stacking of M traces requires the calculation of M energy values. If we take the case of T time samples, a total of 2MT operations (MT multiplications and MT additions) need to be performed to obtain all of the required scaling factors.

In contrast for covanant stacking of M traces, we need to form an (M−1)×(M−1) matrix containing the cross-energy terms of all traces. This requires the calculation of K energy values where K is given by $$K = \sum_{i=1}^{M} i$$

The total number of operations is therefore equal to 2KT The excess number of operations required by covariant stacking is thus.

$$2T \times \sum_{i=1}^{M-1} i$$

For example, if the input is 5 traces consisting of 2000 samples each, diversity stacking requires 20,000 operations, whereas covariant stacking requires 60,000 operations. In addition, the (M−1)×(M−1) matrix needs to be inverted and the inverse matrix multiplied by an (M−1) vector. The number of matrix inversions and matrix-vector multiplications is equal to the number of time windows in a single trace.

Experimental results were taken as shown in the following table

| Noise record | Single sensor configuration | Array configuration | Type of noise |
|---|---|---|---|
| 1 | star-of-5, 4 m between sensors | 33 element on 10 × 10 m grid | Car engine |
| 2 | star-of-5, 4 m between sensors | 33 element on 10 × 10 m grid | Car passing |
| 3 | star-of-5, 4 m. between sensors | 33 element on 10 × 10 m grid | Car on road |
| 4 | star-of-5, 4 m between sensors | 33 element on 10 × 10 m grid | Truck on road |
| 5 | star-of-5, 4 m between sensors | 33 element on 10 × 10 m grid | Drilling operation |
| 6 | star-of-5, 4 m between sensors | 33 element on 10 × 10 m grid | VVFB engine |
| 7 | star-of-5, 4 m between sensors | 33 element on 10 × 10 m grid | Airplane |
| 8 | star-of-5, 4 m between sensors | 33 element on 10 × 10 m grid | Factory |
| 9 | star-of-5, 4 m between sensors | 33 element on 10 × 10 m grid | Steps near spread |
| 10 | star-of-5, 1 m between sensors | 15 element on 2 × 2 m grid | Rain |
| 11 | First 5 elements of array | 18 element array | Wind |

VVFB refers to a seismic vibrator manufactured by Geco-Prakla.

For comparison purposes, the results were processed in seven different ways i. Single sensor output, no processing applied
ii. Sum-of-5 single sensors; straight summation
iii. Diversity stack of 5 single sensors
iv. QMF diversity stack of 5 single sensors
v. Covariant stack of 5 single sensors
vi. QMF covariant stack of 5 single sensors
vii. Array response, straight summation of all array elements The results of the seven techniques applied to the eleven noise records are given in the following table

|   | I | ii | iii | iv | v | vi | vii |
|---|---|---|---|---|---|---|---|
| 1 | 3.7 dB | 0.0 dB | −0.6 dB | −0.7 dB | −2.2 dB | −2.6 dB | −1.9 dB |
| 2 | 4.3 dB | 0.0 dB | −1.4 dB | −1.3 dB | −4.1 dB | −4.6 dB | −1.3 dB |
| 3 | 3.1 dB | 0.0 dB | −0.1 dB | −0.2 dB | −1.5 dB | −1.7 dB | −1.3 dB |
| 4 | 2.4 dB | 0.0 dB | −1.2 dB | −1.7 dB | −2.3 dB | −4.7 dB | −7.6 dB |
| 5 | 10.8 dB | 0.0 dB | −1.4 dB | −1.3 dB | −5.6 dB | −5.9 dB | −4.3 dB |
| 6 | 5.7 dB | 0.0 dB | −1.1 dB | −1.0 dB | −3.6 dB | −3.7 dB | −1.3 dB |
| 7 | 4.1 dB | 0.0 dB | −0.7 dB | −0.8 dB | −3.0 dB | −3.2 dB | −1.7 dB |
| 8 | 4.3 dB | 0.0 dB | −1.4 dB | −1.3 dB | −4.1 dB | −4.6 dB | −1.3 dB |
| 9 | 1.3 dB | 0.0 dB | −2.5 dB | −2.7 dB | −3.3 dB | −4.7 dB | −4.1 dB |
| 10 | 1.7 dB | 0.0 dB | −1.6 dB | −2.0 dB | −3.4 dB | −4.4 dB | −1.4 dB |
| 11 | 2.4 dB | 0.0 dB | −2.8 dB | −5.0 dB | −3.6 dB | −6.7 dB | −8.3 dB |

The QMF process allows for perfect reconstruction after stacking. In the examples shown, data windows were subdivided into 8 frequency bands by the QMF process. As discussed above, the splitting into frequency bands improves noise attenuation because non-uniform noise behaviour as a function of frequency is explicitly accounted for.

The total noise energy for each noise reduction process is shown in the accompanying FIG. 5. The straight trace summation of the 5 single sensors was chosen as the reference (0 dB) reduction process. The array results may not give optimal attenuation because, in the results, the spatial extent of these arrays was limited, nevertheless, the array noise reduction values give some indication. A problem in these results is the almost continuous presence of (low-frequency) factory noise from a near-by factory, the factory noise therefore influences the calculated amount of noise reduction. By displaying the entire noise records in the f–t domain (a technique to facilitate interpretation of the noise behaviour) this restriction is relaxed since then a good impression of the attenuation as a function of frequency can be obtained.

Good results are obtained with 200 ms or 400 ms windows. There is no upper limit but generally, the longer the window, the lower the attenuation.

We consider a single receiver group which is composed of 5 single sensors. The single sensors are grouped in a star pattern, the distance of each element to the group centre is equal to Δx. The configuration is illustrated in plan in FIG. 6. A reflection is received by each of the single sensors. For simplicity, we assume that the traveltime t of the reflection obeys the follow normal move out (NMO)-equation $$t^2 = t_0^2 + \frac{X^2}{V_{rms}^2} \quad \text{NM1}$$

in which $t_0$ denotes the zero-offset traveltime. X the source-receiver distance and $1'_{rm1}$ the stacking velocity. During processing, a travel time correction (normally referred to as the NMO-correction) is applied to correct for the effect of the offset on the traveltime. For this purpose, the equation above is expanded in its first-order Taylor approximation.

This yields $$t - t_0 = \frac{X^2}{2t_0 V_{rms}^2} \qquad \text{NM2}$$

The quantity $t-t_0$ is the NMO correction, and is denoted as $t_{NMO}$ furthermore, approximating $t_0$ by t yields the following expression for the NMO-correction $$t_{NMO} = \frac{X^2}{2t V_{rms}^2} \qquad \text{NM3}$$

In this section, we are not interested in calculating and applying the NMO-corrections to the data. Here, we concentrate on the observation that different sensors within a group have different NMO-shifts, and that this variation in the NMO-correction (thus, not the NMO shift itself) should be removed from the data prior to digital group forming. This will now be explained in more detail.

Provided that there are variations in the distance between a source and a single sensor across the group, each single sensor has a different arrival time of the reflection. The difference in arrival time is assumed to be caused by the difference in offset X only (other perturbations, such as near-surface static variations, are not considered here because they are dealt with by perturbation corrections, as is known). To calculate the difference in reflection arrival time between the single sensors in a group, we need to calculate the derivative of $f_{NMO}$ with respect to X.

$$\frac{dt_{NMO}}{dX} = \frac{X}{tV_{rms}^2} \qquad \text{NM4}$$

If we assume that the group centre is chosen as our reference location, and that this group centre has a source-receiver distance of X, we thus have to correct every remaining single sensor with a time shift to account for the difference in source-receiver offset. The relevant group centre-single sensor distance is not simply the distance between the two, but the inline (i e, the line between source and group centre) component. We denote this relevant distance by $\Delta x_{NMO}$. The following table summarises the relation between element spacing $\Delta x$ and relevant distance to the group centre $\Delta x_{NMO}$, for the various sensors shown in FIG. 6.

| Sensor no. | Distance to group centre | relevant distance $\Delta\chi_{NMO}$ |
|---|---|---|
| S2 | $\Delta\chi$ | $-\Delta\chi$ |
| S3 | $\Delta\chi$ | 0 |
| S4 | $\Delta\chi$ | $\Delta\chi$ |
| S5 | $\Delta\chi$ | 0 |

Note that the relevant distance can also be negative. The "residual" NMO correction $\Delta x_{NMO}$ we then need to apply is obtained by setting $$dX = \Delta x_{NMO} \qquad \text{NM5}$$

This yields $$\Delta x_{NMO} = \frac{X}{tV_{rms}^2} \times \Delta x_{NMO} \qquad \text{NM6}$$

It is not permissible to simply sum all signals because the small time shifts which exist between the reflection signals as a result of different source-receiver distances of the sensors. To determine the magnitude of the NMO-effect, we need to assess how big the various terms in the equation above are. The offset X typically varies between 0 and 4 km. The RMS velocity $V_{RMS}$ typically varies between 1500 m/s (shallow depth) to 5000 m/s (at several seconds depth). The arrival time t varies between 0 and 6 seconds. The relevant geophone spacing $\Delta x_{NMO}$ varies between 0 and 10 m (for single sensor recording), and between 0 and 25 m for conventional geophone arrays.

Obviously, the worst case (i e the largest time shift) occurs for large offset, small arrival times, small stacking velocities and large distance to the group centre. Some typical examples follow.

Geophone array, total length 50 m, reflection at 1 sec, stacking velocity 3000 m/s, offset 3000 m. Maximum time shift within the array 8 3 msec.

Single sensor pattern, 10 m. Distance between sensors, reflection at 1 sec, stacking velocity 3000 m/s, offset 3000 m. Maximum time shift within the pattern: 3.3 msec.

For deeper reflections, we present the following examples.

Geophone array, total length 50 m., reflection at 3 sec, stacking velocity 5000 m/s, offset 3000 m. Maximum time shift within the array: 1 msec.

Single sensor pattern, 10 m. distance between sensors, reflection at 3 sec, stacking velocity 5000 m/s, offset 3000 m. Maximum time shift within the pattern: 0.4 msec.

These time shifts are significant because they degrade the quality of the summed trace. The effect is frequency-dependent and its severity increases with frequency. Of course, the time shifts decrease linearly with decreasing offset; also, smaller single sensor patterns will reduce the time shifts. But, as correction for these time shifts may well be feasible for single sensor recording, we should take this opportunity to remove these NMO perturbations from the data. For shear wave recording, where the stacking velocities are typically smaller than for P-waves (compression waves), the effect will be largest The present invention is particularly applicable to vibroseis which utilises an oscillating source. Such a source typically comprises a baseplate mounted on a truck which is brought into contact with the earth and vibrated. Long signals (typically of the order of 10 seconds) are received by a geophone and these are processed by correlation with the input signal to compress the signals into a range of 50–200 milliseconds. Because the reception signal at a single geophone will be almost identical over the time of measurement, the vertical stacking required for the "sweeps" of vibroseis measurement is ideally suited to covariant stacking.

To summarise, three general applications for the present invention are given as particular examples.

1. Summing traces from geophones in the field by placing geophones close together (say, up to about 20 m apart), removing all of the local variations in amplitude and arrival time by performing perturbation corrections and apply a Normal Move Out correction.

2. Summing several sweeps emitted subsequently by the same vibrator (array) and received by the same geophone. This is called vertical stacking and, in principle, no correction for differences in received signal need be made. The processing indicated at 1 could be applied to compensate for differences in source strength between sweeps, due for example to poorer contact between the vibrator and the ground. Since data collected in this way has a very poor signal-to noise ratio, the techniques of the present invention are particularly applicable to this type of data, especially before correlation is performed.

3. Summing traces from a collection of shot-receiver pairs whose reflection signals originate from the same reflection point on the sub-surface (a CMP gather). The traces would have been corrected from Normal Move Out. In common with case 2, the processing of case 1 may optionally be applied.

The common ground between these cases is that the traces all have, after processing as appropriate, very similar reflection signals.

In conclusion:

Covariant stack provides better random noise attenuation than the diversity stack or straightforward trace summation, for all data sets evaluated.

Application of QMF improves the performance of the covariant stacking, the amount of improvement varies from very small to approximately 3 dB.

Increasing the window size reduces the performance of covariant stacking

To reduce weighting factor computation time, weighting factors may be calculated only for particular times and/or frequencies and the weighting factors for the other times and/or frequencies may be determined by interpolating between these calculated weighting factors. Linear interpolation may be used, for instance, to ensure that the interpolated weighting factors always add up to one. This type of method also provides for smooth transitions of the weighting factors and may eliminate the need for the weighting factor smoothing process described above.

A modification of the embodiment described above is particularly useful in attenuating spikes in the seismic traces. Spikes in the seismic traces may be due, for instance, to localized high amplitude noise (caused by vehicle traffic, footsteps, electric fences, etc.) or to seismic data acquisition system problems (caused by system noise, analog to digital converter errors, data transmission problems, etc.). For many types of seismic data acquisition system problems, "missing" or corrupted seismic data values will be assigned zero amplitude values and these zero amplitude values will create data processing problems that are very similar to the problems introduced by the conventional sources of spike noise discussed above.

It is important that spikes be removed from the seismic traces as soon as possible and as completely as possible during seismic data processing (and preferably during the stacking process) because short duration but high intensity spikes in the time domain become smeared into adjacent samples or adjacent traces when performing certain types of operations in the frequency and/or wavenumber domain. Once this type of noise has been smeared into the data in adjacent traces, it becomes almost impossible to completely remove the noise using conventional noise removal techniques, such as bandpass filtering, wavenumber filtering, or K-F filtering.

To improve the inventive method's ability to remove spikes, the calculated weighting factors may be assigned to the particular times and/or frequencies having a maximum relative amplitude. When operating in the time domain, this may involve assigning the calculated weighting factor to the particular time associated with the sample having a peak signal amplitude within the window for all of seismic traces. This can be contrasted to the assignment of the calculated weighting factors for a given window to the centre (i.e. mid-point) sample of the window that is discussed above.

If a seismic trace window contains a spike, the weighting factor calculated for that particular seismic trace window will be relatively low compared to the weighting factors calculated for the other seismic trace windows. If the spike is located near one of the edges of the window and the weighting factor interpolation scheme discussed above is used, the weighting factor applied to the particular spike sample or samples will be an average value of the relatively small weighting factor for the actual window in which the spike lies and the weighting factor derived for the nearest adjacent window. If, however, the weighting factor is applied precisely at the location of the high amplitude spike, the calculated relatively small weighting factor will be applied directly to the spike values themselves, thus more effectively attenuating the spike in the output trace. It can be seen that this method offers identical results when the highest amplitude sample is located at the mid-point of the window and offers improved results when the spike is of relatively large amplitude and is located nearer one of the edges of the window.

In normal applications of the inventive method, white noise will be added to the diagonal of the matrix $\tilde{X}$ (described in equation NE2) to increase the stability of the weighting factor determination process. The magnitude of the white noise added will represent a trade off between filter accuracy and filter stability during the weighting factor determination process.

It may also be preferable to set a maximum limit value for the calculated weighting factors to prevent weak or dead seismic traces (i.e. seismic traces having very low amplitudes) from unduly influencing the composition of the stacked seismic trace

What is claimed is:

1. A method of stacking a plurality of seismic traces comprising deriving a representation of the noise component of each of the seismic traces, deriving an indication of a correlation between the noise components from the representations of the noise components and producing a stacked seismic trace by combining the plurality of seismic traces in proportions derived from the correlation indications.

2. A method as claimed in claim 1, wherein the indication of the correlation between the representations of the noise components is the cross energy density of the noise components.

3. A method as claimed in claim 2, wherein the proportions are derived from minimising a differential of the cross energy density of the noise components.

4. A method as claimed in claim 3, wherein the proportions are derived in an iterative manner.

5. A method as claimed in claim 4, wherein the seismic traces are separated into a plurality of time windows.

6. A method as claimed in claim 5, wherein the time window has a length between 50 millisecond and 1 second.

7. A method as claimed in claim 6, wherein the plurality of seismic traces are separated into a plurality of bands at different frequencies before stacking.

8. A method as claimed in claim 7, wherein the seismic traces are separated using a quadrature mirror filter.

9. A method as claimed claim 8, wherein the representation of the noise component is the noise energy of the noise components.

10. A method as claimed in claim 9, wherein the proportions are derived after removal of DC components in the seismic traces.

11. A method as claimed in claim 10, further comprising deriving a correlation coefficient between seismic traces and applying diversity stacking to the traces if the correlation coefficient is greater than a threshold.

12. A method as claimed in claim 11, wherein the threshold is between 0.6 and 0.9.

13. A method as claimed in claim 12, wherein the plurality of seismic traces are derived from different sensors simultaneously.

14. A method as claimed in claim 12, wherein the plurality of seismic traces are derived from vibroseis.

15. A method as claimed in claim 14, wherein proportions derived from correlation indications are assigned to at least one of particular times and frequencies, and proportions for intermediate points between these particular times and/or frequencies are calculated by interpolating between the assigned derived proportions.

16. A method as claimed in claim 15, wherein said derived proportions are assigned to particular times and/or frequencies where said seismic traces have maximum relative amplitudes.

17. A method as claimed in claim 1, wherein a noise energy, $N^2$ of the stacked seismic trace is given by Equation M22 where $E(n_i n_j)$ is a cross energy density of noise components and w is a weighting factor.

18. A method as claimed in claim 17, wherein producing the stacked seismic trace comprises determining weighting factors wi such that a signal-to-noise (S/N) ratio is maximized.

19. A method as claimed in claim 18, wherein the weighting factors $w_i$ are subject to a constraint that a sum of the weighting factors $w_i$ is unity.

20. A method as claimed in claim 19, wherein the S/N ratio is given by Equation M5, M is a number of geophones, r is a reflection signal received by the geophones, n is a noise signal, $E(r2)$ is a reflection signal energy, $E(n_i n_j)$ is a cross energy density of noise components, and w is a weighting factor.

* * * * *